(12) United States Patent
Mori

(10) Patent No.: US 11,038,213 B2
(45) Date of Patent: Jun. 15, 2021

(54) BATTERY PACK AND CONTROL METHOD

(71) Applicant: MURATA MANUFACTURING CO., LTD., Kyoto (JP)

(72) Inventor: Yasushi Mori, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 16/046,406

(22) Filed: Jul. 26, 2018

(65) Prior Publication Data

US 2018/0375177 A1 Dec. 27, 2018

Related U.S. Application Data

(63) Continuation of application No. PCT/JP2017/005623, filed on Feb. 16, 2017.

(30) Foreign Application Priority Data

Mar. 1, 2016 (JP) .............................. JP2016-039379

(51) Int. Cl.
| | |
|---|---|
| *H01M 10/44* | (2006.01) |
| *H02J 7/00* | (2006.01) |
| *H02J 7/34* | (2006.01) |
| *H01M 10/42* | (2006.01) |
| *H02J 1/10* | (2006.01) |
| *H01M 16/00* | (2006.01) |

(52) U.S. Cl.
CPC ..... *H01M 10/441* (2013.01); *H01M 10/4207* (2013.01); *H02J 1/10* (2013.01); *H02J 7/0021* (2013.01); *H02J 7/0024* (2013.01); *H02J 7/0047* (2013.01); *H02J 7/0068* (2013.01); *H02J 7/00718* (2020.01); *H02J 7/34* (2013.01); *H01M 16/00* (2013.01); *H02J 7/0048* (2020.01)

(58) Field of Classification Search
CPC ............. H01M 10/441; H01M 10/4207; H02J 7/0047; H02J 7/0068; H02J 7/0083; H02J 7/34; H02J 1/10
See application file for complete search history.

(56) References Cited

U.S. PATENT DOCUMENTS

| | | |
|---|---|---|
| 9,847,563 B2 | 12/2017 | Ochi et al. |
| 2006/0279086 A1 | 12/2006 | Kishibata et al. |

(Continued)

FOREIGN PATENT DOCUMENTS

| | | |
|---|---|---|
| JP | 2003-045387 | 2/2003 |
| JP | 2013-045387 A | 2/2003 |

(Continued)

OTHER PUBLICATIONS

International Search Report and Written Opinion issued in connection with International Patent Application No. PCT/JP2017/005623, dated Apr. 11, 2017. (10 pages).

(Continued)

*Primary Examiner* — Richard Isla
*Assistant Examiner* — Johali A Torres Ruiz
(74) *Attorney, Agent, or Firm* — K&L Gates LLP

(57) ABSTRACT

A battery pack includes a plurality of secondary batteries having different discharge characteristics; at least one switch configured to switch a secondary battery connected to a load among the secondary batteries; and a controller configured to control the switch.

12 Claims, 7 Drawing Sheets

(56) References Cited

U.S. PATENT DOCUMENTS

| | | | | |
|---|---|---|---|---|
| 2011/0227414 A1* | 9/2011 | Fischer | .................. | H02J 9/062 |
| | | | | 307/66 |
| 2013/0103333 A1* | 4/2013 | Nishida | ............... | H01M 10/482 |
| | | | | 702/63 |
| 2015/0097425 A1* | 4/2015 | Kimura | .................. | B60L 50/66 |
| | | | | 307/10.1 |
| 2015/0194707 A1* | 7/2015 | Park | ................ | H01M 10/4207 |
| | | | | 429/50 |
| 2015/0333543 A1* | 11/2015 | Hempel | ............... | H02J 7/00711 |
| | | | | 320/129 |
| 2017/0054303 A1* | 2/2017 | Choi | ..................... | H01M 10/44 |
| 2017/0125869 A1* | 5/2017 | Ochi | .................. | H01M 10/425 |

FOREIGN PATENT DOCUMENTS

| | | |
|---|---|---|
| JP | 2006-344447 A | 12/2006 |
| JP | 2012-234697 | 11/2012 |
| JP | 2012-234697 A | 11/2012 |
| JP | 2013-085413 A | 5/2013 |
| WO | 2015/151374 A1 | 10/2015 |
| WO | 2015/151374 | 4/2017 |

OTHER PUBLICATIONS

Chinese Office Action dated Sep. 21, 2020 in corresponding Chinese Application No. 2017800111025.
Chinese Search Report dated Feb. 16, 2017 in corresponding Chinese Application No. 2017800111025.

\* cited by examiner

BATTERY PACK AND CONTROL METHOD

CROSS REFERENCE TO RELATED APPLICATIONS

The present application is a continuation of PCT patent application no. PCT/JP2017/005623, filed on Feb. 16, 2017, which claims priority to Japanese patent application no. JP2016-039379 filed on Mar. 1, 2016, the entire contents of which are being incorporated herein by reference.

BACKGROUND

The present technology relates to a battery pack and a control method. More specifically, the present technology relates to a battery pack including a plurality of secondary batteries having different discharge characteristics and a control method for controlling the charge and discharge of the battery pack.

Battery packs are used in various fields as power source for electric vehicles, notebook personal computers, mobile terminals, video cameras, digital cameras, and the like. This battery pack is configured by connecting a plurality of secondary batteries in series or in parallel and is required to have excellent characteristics.

In response to this requirement, it has been proposed to connect a high-output battery and a high-capacity battery in parallel, perform discharge from the high-output battery at the time of high load, and perform discharge from the high-capacity battery at the time of low load. This has been considered to enable provision of a small-sized battery pack, thereby reducing heat generation at high output and improving a cycle life.

In such a battery pack, at the early stage of discharge, the state of charge (SOC) of the high-output battery is high, so that discharge is performed preferentially from the high-output battery at the time of high load.

However, at the end stage of discharge, the battery voltage of the high-output battery becomes low because the high-output battery has a small capacity, and a phenomenon occurs where the high-output battery is charged from the high-capacity battery. Hence a large current flows to the high-capacity battery at the time of high load to bring the battery into a state close to a short circuit and reduce the life of the battery, which has been problematic.

SUMMARY

The present technology relates to a battery pack and a control method. More specifically, the present technology relates to a battery pack including a plurality of secondary batteries having different discharge characteristics and a control method for controlling the charge and discharge of the battery pack.

The present technology, for example, provides a battery pack and a control method capable of achieving both high-load discharge and long-hour power supply regardless of the discharge timing.

According to an embodiment of the present technology, a battery pack is provided. The battery pack includes: a plurality of secondary batteries having different discharge characteristics; at least one switch configured to switch a secondary battery connected to a load among the secondary batteries; and a controller configured to control the switch.

According to an embodiment of the present technology, a control method for controlling charge and discharge of a battery pack is provided. The control method is by switching a switch in the battery pack including a plurality of secondary batteries having different discharge characteristics, and at least one switch configured to switch a secondary battery connected to a load among the secondary batteries.

According to an embodiment of the present technology, it is possible to provide a battery pack and a control method capable of achieving both high-load discharge and long-hour power supply. It should be understood that the effects described herein are non-limiting, and other suitable properties relating to the present technology may be realized and as further described.

DETAILED DESCRIPTION

The present technology relates to a battery pack and a control method. More specifically, the present technology relates to a battery pack including a plurality of secondary batteries having different discharge characteristics and a control method for controlling the charge and discharge of the battery pack. As described herein, the present disclosure will be described based on examples with reference to the drawings, but the present disclosure is not to be considered limited to the examples, and various numerical values and materials in the examples are considered by way of example.

Figure 1:
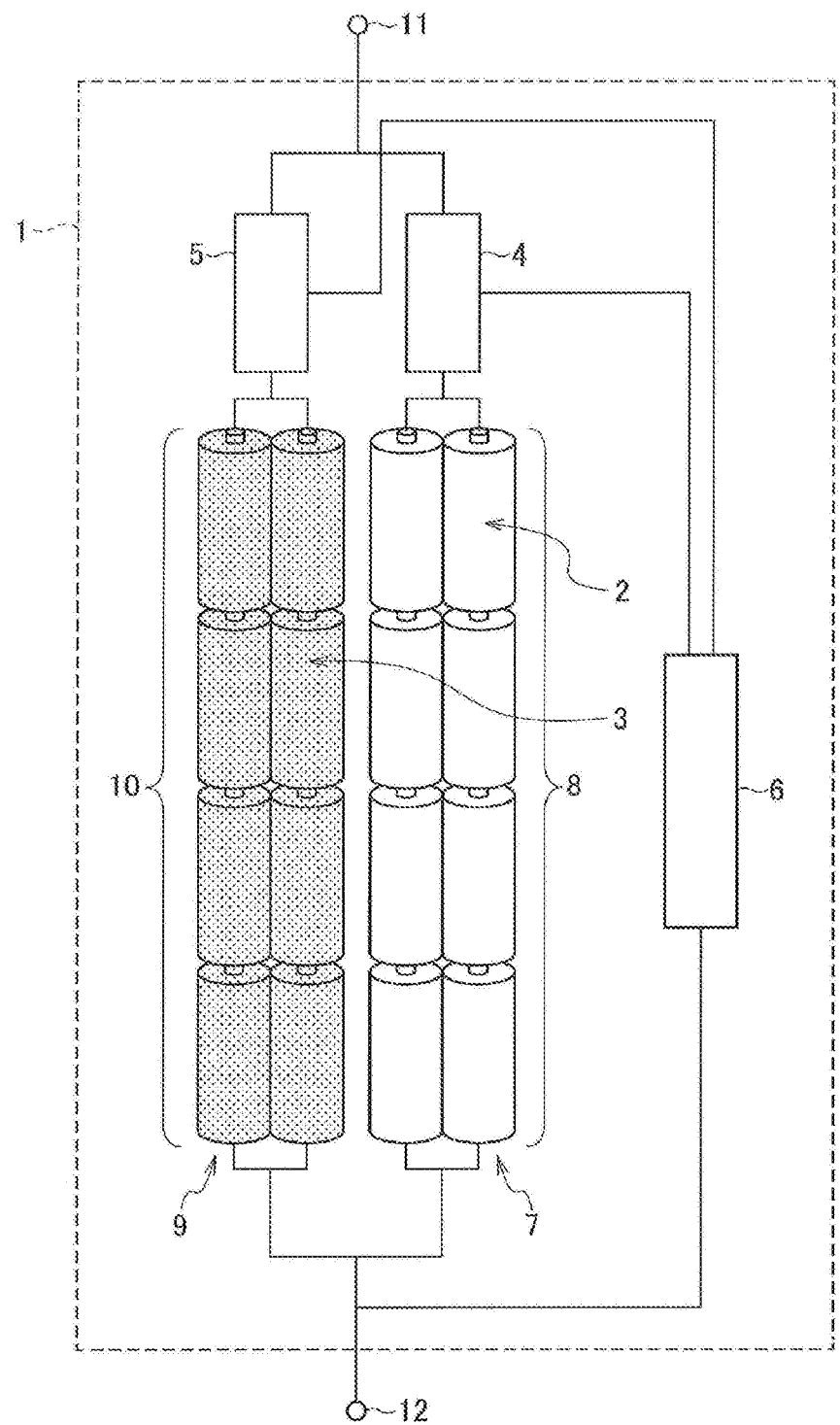
FIG. 1 is a schematic diagram showing a configuration of a battery pack according to an embodiment of the present technology.

FIG. 1 is a schematic diagram showing a configuration of a battery pack according to an embodiment of the present technology.

As shown in FIG. 1, a battery pack 1 according to the present embodiment includes a plurality of high-output secondary batteries 2, a plurality of high-capacity secondary batteries 3, a switch circuit 4 connected to the high-output secondary battery 2, a switch circuit 5 connected to the high-capacity secondary battery 3, and a control unit (controller) 6 for controlling the switch circuits 4 and 5.

Here, the "high-output secondary battery" refers to a secondary battery with low internal resistance, being chargeable and dischargeable with a relatively large current as compared with other secondary batteries having different charge or discharge or both charge and discharge characteristics. The "high-capacity secondary battery" refers to a secondary battery with high internal resistance, having a relatively high energy capacity as compared with other secondary batteries having different charge or discharge or both charge and discharge characteristics. In the present embodiment, a "high output" is defined as a first discharge characteristic, and a "high capacitance" is defined as a second discharge characteristic.

In the present embodiment, two battery rows 7, each formed by electrically connecting four high-output secondary batteries 2 in series, are electrically connected in parallel to form a high-output battery group 8 which is a first battery group. Similarly, two rows of battery rows 9, each formed by electrically connecting four high-capacity secondary batteries 3 in series, are electrically connected in parallel to form a high-capacity battery group 10 which is a second battery group. It should be understood that the number of secondary batteries in the battery row and the number of battery rows in the battery pack according to the present technique are not limited to the present embodiment.

The switch circuit 4 is electrically connected in series between the positive electrode side of the high-output battery group 8 and a positive electrode terminal 11 of the battery pack 1. The switch circuit 4 switches ON/OFF of the current of the high-output secondary battery 2. Similarly, the switch circuit 5 is electrically connected in series between the positive electrode side of the high-capacity battery group 10 and the positive electrode terminal 11 of the battery pack 1. The switch circuit 5 switches ON/OFF of the current of the high-capacity secondary battery 3.

One end of the control unit 6 is electrically connected to the switch circuits 4 and 5. The other end of the control unit 6 is electrically connected between the negative electrode sides of the high-output battery group 8 and the high-capacity battery group 10 and a negative electrode terminal 12 of the battery pack 1. The control unit 6 (controller) including a processor controls switching of the switch circuits 4 and 5.

As described above, in the battery pack 1 according to the present embodiment, the switch circuits 4 and 5 are respectively connected to the battery groups 8 and 10 having the plurality of secondary batteries 2 and 3 with different charge or discharge or both charge and discharge characteristics, and the battery groups 8 and 10 are combined in an independently dischargeable manner.

Figure 2:
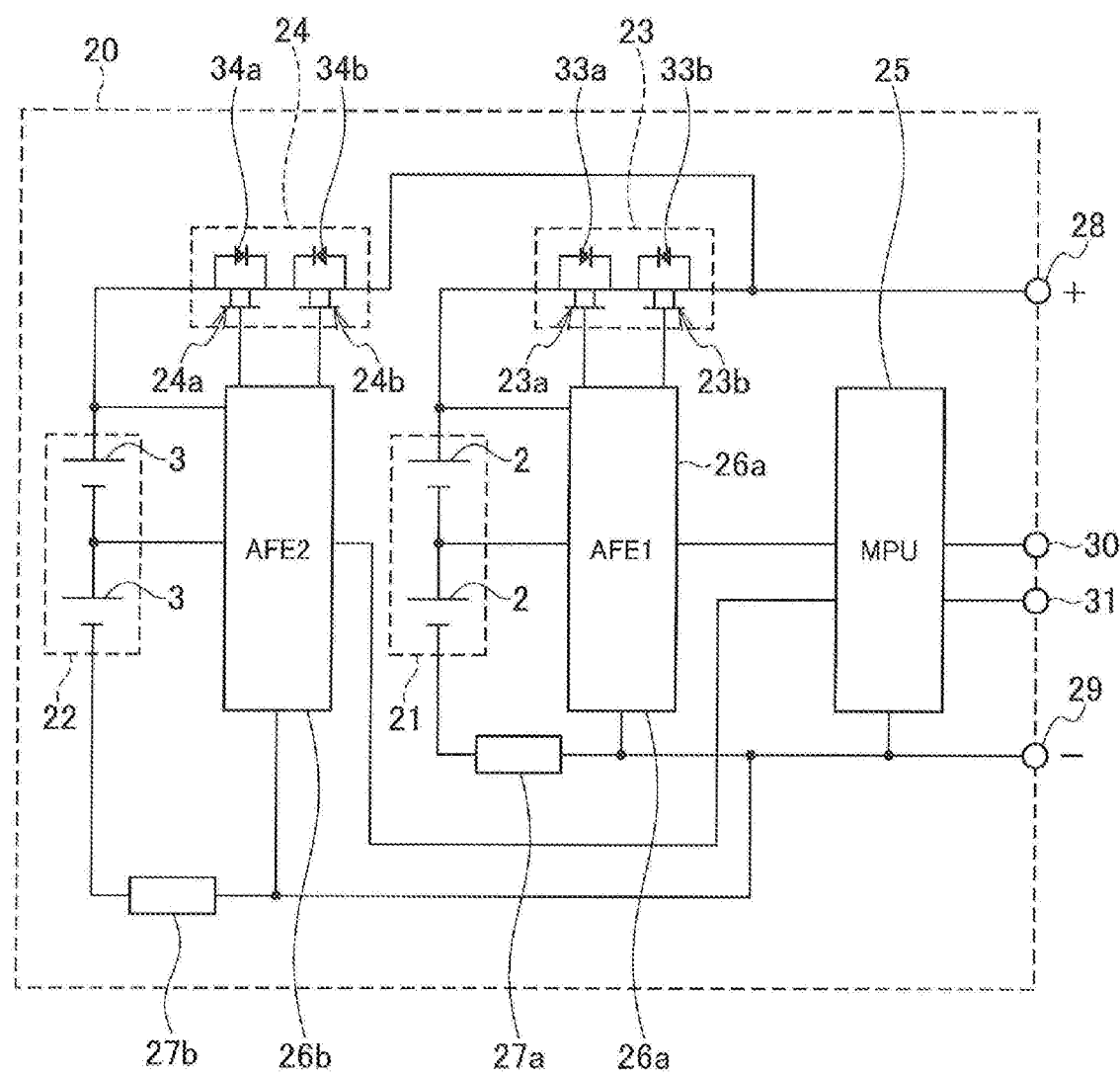
FIG. 2 is a block diagram showing a circuit configuration of a battery pack according to an embodiment of the present technology.

FIG. 2 is a block diagram showing a circuit configuration example of a battery pack according to an embodiment of the present technology.

As shown in FIG. 2, a battery pack 20 according to the present embodiment includes a high-output battery group 21 being the first battery group, a high-capacity battery group 22 being the second battery group, a switch circuit 23 electrically connected in series to the high-output battery group 21, a switch circuit 24 electrically connected in series to the high-capacity battery group 22, a micro-processing unit (MPU or micro-processor) 25, analog front ends (AFEs) 26a and 26b, current measurement resistors 27a and 27b, a positive electrode terminal 28, and a negative electrode terminal 29. The MPU 25 and the AFEs 26a and 26b constitute a control unit (controller) of the battery pack 20.

The high-output battery group 21 and the high-capacity battery group 22 are secondary batteries such as lithium ion secondary batteries and are battery groups each formed by connecting a plurality of batteries 2 in series and/or in parallel. In the present embodiment, a case will be described where two secondary batteries 2 and 3 are connected in series. Note that the number of secondary batteries of the present technique is not limited to two, but the number may be one, or three or more.

The switch circuit 23 is electrically connected in series between the positive electrode side of the high-output battery group 21 and the positive electrode terminal 28 of the battery pack 20. The switch circuit 23 switches ON/OFF of the charge or discharge or both charge and discharge current of the high-output battery group 21. The switch circuit 23 includes a charge control FET 23a, a discharge control FET 23b, and parasitic diodes 33a and 33b, and is controlled by the MPU 25 via the AFE (AFE 1) 26a. The charge control FET 23a and the discharge control FET 23b are turned off when the load current becomes equal to or smaller than a predetermined threshold, and are controlled by the MPU 25 such that the charge current and the discharge current do not flow in the current path of the high-output battery group 21. After the charge control FET 23a and the discharge control FET 23b are turned off, discharge or charge can be performed through the parasitic diode 33a or 33b.

Similarly, the switch circuit 24 is electrically connected in series between the positive electrode side of the high-capacity battery group 22 and the positive electrode terminal 28 of the battery pack 20. The switch circuit 24 switches ON/OFF of the charge or discharge or both charge and discharge current of the high-capacity battery group 22. The switch circuit 24 includes a charge control FET 24a, a discharge control FET 24b, and parasitic diodes 34a and 34b, and is controlled by the MPU 25 via the AFE (AFE 2) 26b. The charge control FET 24a and the discharge control FET 24b are turned off when the load current is larger than a predetermined threshold, and are controlled by the MPU 25 such that the charge current and the discharge current do not flow in the current path of the high-capacity battery group 22. After the charge control FET 24a and the discharge control FET 24b are turned off, discharge or charge can be performed through the parasitic diode 34a or 34b.

One end of the MPU 25 is electrically connected to the switch circuits 23 and 24 via the AFEs 26a and 26b respectively. The other end of the MPU 25 is electrically connected between the negative electrode sides of the high-output battery group 21 and the high-capacity battery group 22 and the negative electrode terminal 29 of the battery pack 20. The MPU 25 controls the switch circuits 23 and 24 based on the magnitude of the discharge load. That is, by comparing the magnitude of the charge current or the discharge current flowing in the circuit of the battery pack 20 with the predetermined threshold, the MPU 25 generates ON/OFF switching command signals of the switch circuits 23 and 24. The switch circuit 23 and 24 switches ON/OFF in accordance with a command signal from the MPU 25 via the AFEs 26a and 26b respectively. Here, for example when a low load current of 2 A and a high load current of 10 A flow in the circuit, the predetermined threshold may be set to 6 A by taking an average value of these currents. Further, for example when a low load current of 1 A and a high load current of 30 A flow in the circuit, the threshold is desirably set in accordance with a discharge current characteristic of equipment connected to the battery pack 20, such as setting the predetermined threshold to 15 A.

The MPU 25 includes a communication terminal 30 and a communication terminal 31. When the battery pack 20 is connected to a load of an external electronic device or the like, the MPU 25 may be connected to a communication terminal provided in the load so as to be able to communicate with the external electronic devices or the like. The MPU 25 also functions as a notification unit for notifying that the internal resistance value of the high-output secondary battery 2 is larger than the internal resistance value of the high-capacity secondary battery 3 in the battery pack 20. In accordance with a program previously stored into a read only memory (ROM) which is not shown, the MPU 25 controls each unit by using a random access memory (RAM) which is not shown, as a work memory.

The AFEs 26a and 26b are analog circuits connecting the switch circuits 23 and 24 and the MPU 25, and measure the direction and magnitude of each of the voltages and currents of the secondary batteries 2 and 3 at every predetermined time.

The current measurement resistors 27a and 27b are shunt resistors, for example, and are inserted in series into a circuit and perform current/voltage conversion with an AD converter inside, so as to measure the current of the circuit in the battery pack 20. In the present embodiment, the current measurement resistors 27a and 27b are connected in series to the negative electrode sides of the high-output battery group 21 and the high-capacity battery group 22, respectively. When a current flows in each of the current measurement resistors 27a and 27b, a voltage difference occurs between both ends of each of the current measurement resistors 27a and 27b according to the Ohm's law. The voltage difference is measured using the AD converter in each of the current measurement resistors 27a and 27b, to measure the current value. The current measurement resistors 27a and 27b each integrate the current value to obtain a charge or discharge or both charge and discharge capacity per unit time and can thus calculate a SOC.

The positive electrode terminal 28 and the negative electrode terminal 29 of the battery pack 20 are connected to the load of the external electronic device or the like, and respectively to a positive electrode terminal and a negative electrode terminal of a charger, and to perform charge and discharge of the high-output battery group 21 and the high-capacity battery group 22. For example, the positive electrode terminal 28 and the negative electrode terminal 29 may in the form of being connected to a connector or the like.

As shown in FIG. 2, the battery pack 20 has a circuit configuration in which the switch circuits 23 and 24 for controlling charge and discharge are connected to the respective battery groups 21 and 22 so that discharge can be performed independently from each of the battery groups 21, 22.

Moreover, the high-output battery group 21 is disposed closer to the positive electrode terminal 28 and the negative electrode terminal 29 of the battery pack 20 than the high-capacity battery group 22 is. It is thereby possible to suppress an impedance rise due to wiring, and to suppress a voltage drop at the time of high load. At this time, the wiring length on the high-capacity battery group 22 side is longer, but the load on the high-capacity battery group 22 side can be kept low by control, whereby the voltage drop due to the impedance rise causes no problem.

When the discharge current is to be controlled by the switch circuits 23 and 24, ON/OFF switching is performed in accordance with the condition of the discharge load. For example, when a high load current exceeding a predetermined threshold flows in the circuit of the battery pack 20, the switch circuit 23 is turned on and the switch circuit 24 is turned off, to thereby perform discharge only from the high-output battery group 21. On the other hand, when a low load current flows in the circuit of the battery pack 20, the switch circuit 23 is turned off and the switch circuit 24 is turned on, to thereby perform discharge only from the high-capacity battery group 22.

When the charge current is to be controlled by the switch circuits 23 and 24, because the battery capacity (SOC) is assumed to be different between the high-output secondary battery 2 and the high-capacity secondary battery 3 at the start of charge, the capacity balance can be taken as follows: the switch circuit of the battery group with a high battery voltage is turned off to stop the charge, the voltage of the battery group with a low battery voltage increases due to charge, and when the voltages of the respective battery groups become equal, the switch circuit of the battery group with a high battery voltage is turned on.

Here, when the batteries with different discharge characteristics are connected in parallel for discharge while the capacity balance is not taken, a charge current flows from the battery with a large capacity and a high voltage to the battery with a small capacity and a low voltage. When discharge is performed in this state, both discharge currents, which are the charge current to the low-voltage battery and the discharge current to the device, flow from the high-voltage battery, resulting in that an excessive current flows.

However, in the battery pack 20 of the present embodiment, the capacity balance can be taken as described above, thereby enabling simultaneous discharge from the battery groups 21 and 22.

With each of the battery groups 21 and 22 of the present embodiment configured to be independently dischargeable, when the SOC of the high-output battery group 21 is on the decrease, the threshold of the current for switching is increased to suppress discharge from the high-output battery group 21 and preferentially perform discharge from the high-capacity battery group 22, so that the capacity of the high-output battery group 21 can be kept until the end stage of discharge.

Figure 3:
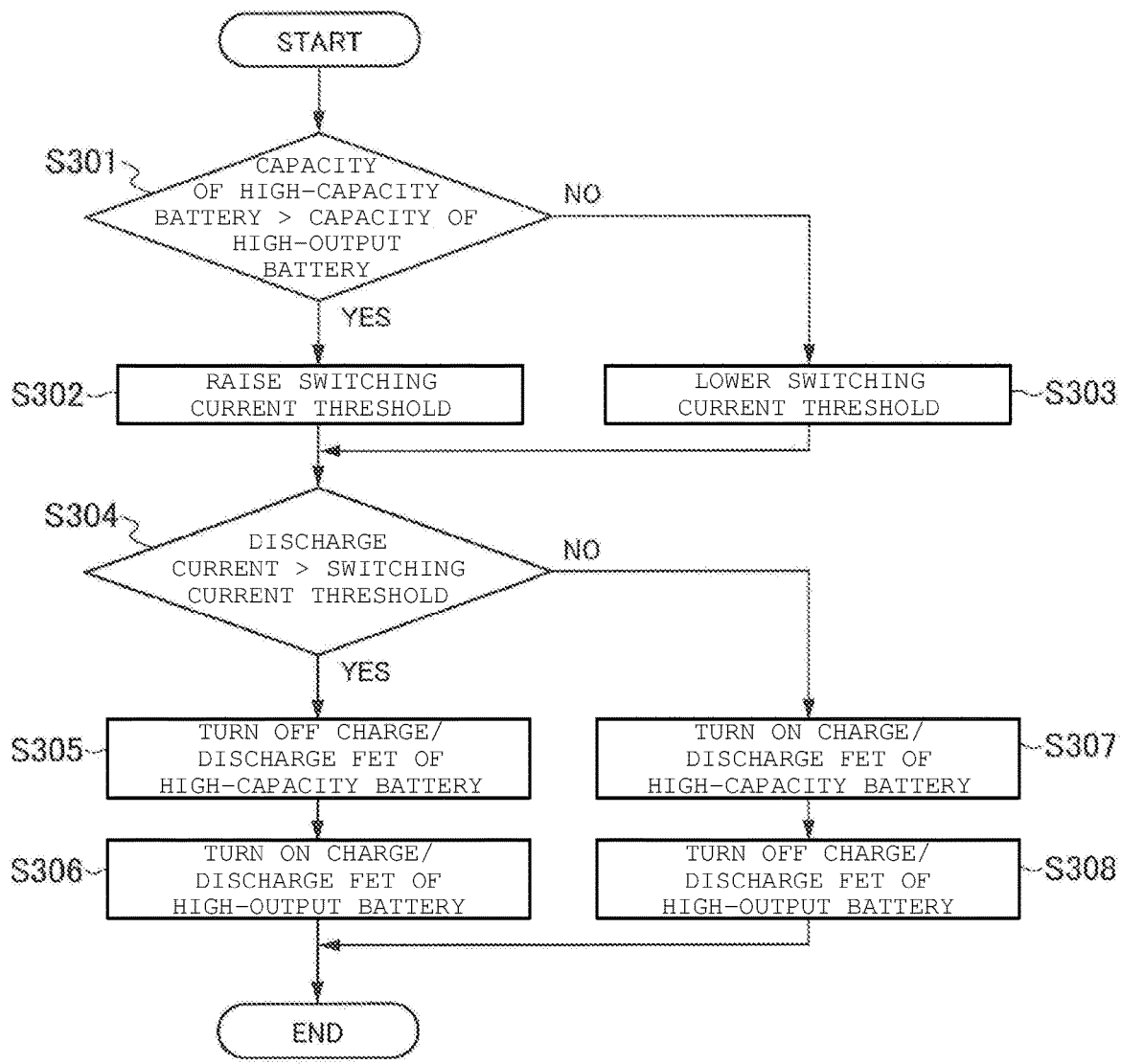
FIG. 3 is a flowchart for explaining a control method for controlling charge and discharge of a battery pack according to an embodiment of the present technology.

FIG. 3 is a flowchart for explaining a control method for the battery pack according to an embodiment of the present technology. Each procedure will be described below.

The flow of the processing for controlling discharge of the battery pack 20 during discharge will be described with reference to the flowchart of FIG. 3. Unless otherwise specified, the following processing is performed under control of the MPU 25. For example, the battery pack 20 is connected to an external load, and discharge from the battery pack 20 is started, thereby starting a series of processing.

First, in Step S301, the MPU 25 determines whether or not a battery capacity of a high-capacity battery 22 is larger than a battery capacity of a high-output battery 21.

When the determination is YES, that is, when the battery capacity of the high-capacity battery is larger than the battery capacity of the high-output battery, the processing proceeds to Step S302, and the MPU 25 increases the switching current threshold.

On the other hand, when the determination is NO, that is, when the battery capacity of the high-capacity battery is equal to or smaller than the battery capacity of the high-output battery, the processing proceeds to Step S303, and the MPU 25 decreases the switching current threshold.

Next, in Step S304, the MPU 25 determines whether or not the discharge current is larger than the switching current threshold after increasing or decreasing the switching current threshold in Step S302 or Step S303.

When the determination is YES, that is, when the discharge current is larger than the switching current threshold, the processing proceeds to Step S305, and the MPU 25 turns off the FET of the high-capacity battery. Furthermore, in Step S306, the MPU 25 turns on the FET of the high-output battery.

On the other hand, when the determination is NO, that is, when the discharge current is equal to or smaller than the switching current threshold, the MPU 25 turns on the FET of the high-capacity battery in Step S307. Further, in Step S308, the MPU 25 turns off the FET of the high-output battery.

When the FET of the high-capacity battery is turned on or off in Step S307 or Step S308, the switching processing of the FET in the battery pack shown in FIG. 3 is terminated.

According to the method described herein, with each of the battery pack 20 of the present embodiment configured to be independently dischargeable, when the SOC of the high-output battery group 21 is on the decrease, the threshold of the current for switching is increased to suppress discharge from the high-output battery group 21 and preferentially perform discharge from the high-capacity battery group 22, so that the capacity of the high-output battery group 21 can be kept until the end stage of discharge.

Figure 4:
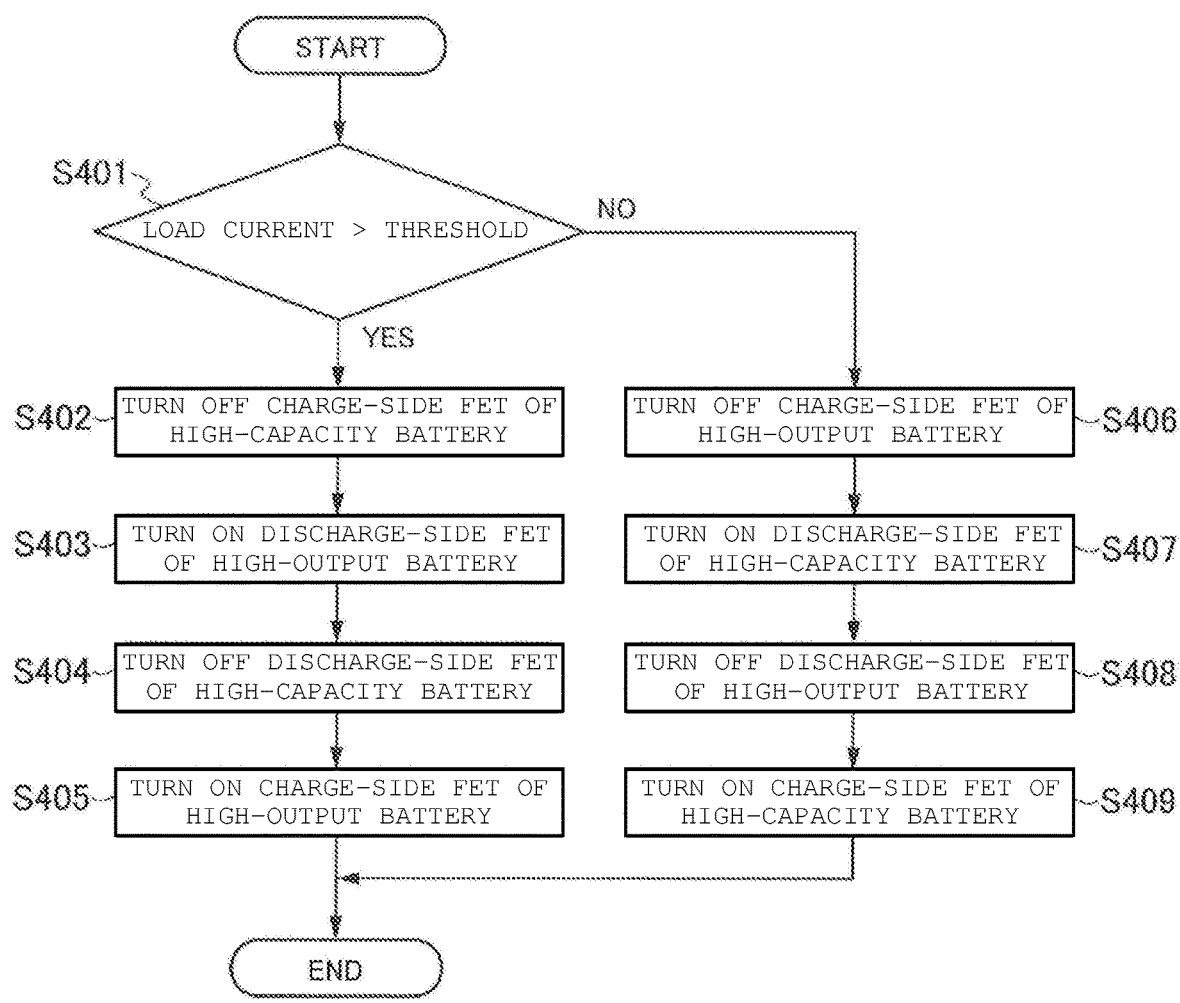
FIG. 4 is a flowchart for explaining a control method for controlling charge and discharge of a battery pack according to another embodiment of the present technology.

FIG. 4 is a flowchart for explaining another control method for the battery pack according to an embodiment of the present technology. Specifically, FIG. 4 is a flowchart for explaining control in the case of dividing the switch into a charge-side FET and a discharge-side FET. Each procedure will be described below.

First, in Step S401, the MPU 25 determines whether or not the load current is larger than a predetermined threshold.

When the determination is YES, that is, when the load current is a high load current larger than the predetermined threshold, the processing proceeds to Step S402, and the MPU 25 turns off the charge-side FET of the switch 2. When turning off the charge-side FET of the switch 2, in Step S403, the MPU 25 turns on the discharge-side FET of the switch 1.

Next, in Step S404, the MPU 25 turns off the discharge-side FET of the switch 2. When turning off the discharge-side FET of the switch 2, in Step S405, the MPU 25 turns on the charge-side FET of the switch 1.

On the other hand, when the determination is NO, that is, when the load current is a low load current equal to or smaller than the predetermined threshold, in Step S406, the MPU 25 turns off the charge-side FET of the switch 1. When turning off the charge-side FET of the switch 1, in Step S407, the MPU 25 turns on the discharge-side FET of the switch 2.

Next, in Step S408, the MPU 25 turns off the discharge-side FET of the switch 1. When turning off the discharge-side FET of the switch 1, in Step S409, the MPU 25 turns on the charge-side FET of the switch 2.

When the charge-side FET of the switch 1 or 2 is turned on, the switching processing of the FET in the battery pack shown in FIG. 4 is terminated.

Controlling the FET in this order enables discharge via the parasitic diode of the charge FET at the time of switching, so that switching is possible without stopping discharge and without causing the flow of an unnecessary charge current.

Figure 5:
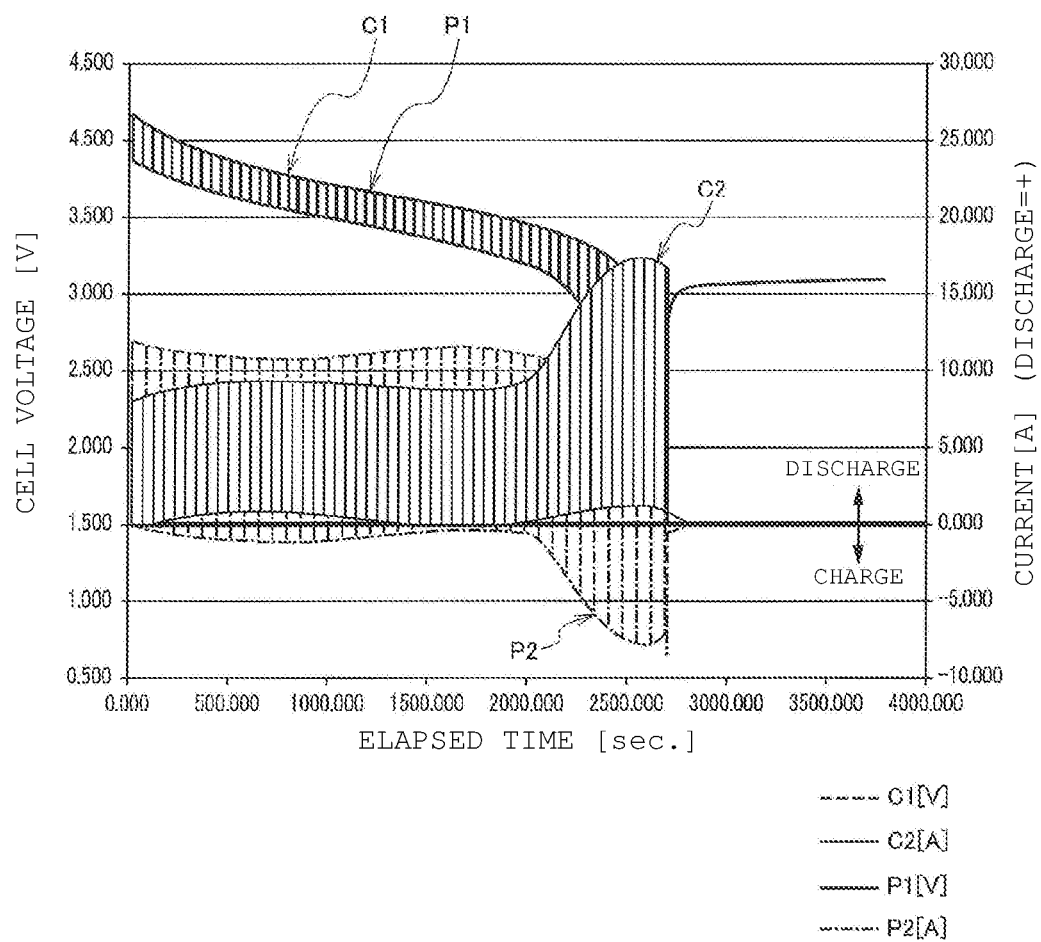
FIG. 5 is a graph illustrating a result of a discharge test using a conventional battery pack.

FIG. 5 is a graph showing results of a pulse discharge test using a conventional battery pack.

In FIG. 5, a thick solid line P1 indicates a voltage of a high-output battery 2, and a one-dotted broken line P2 indicates a discharge current flowing in the high-output battery 2. Likewise, a dotted line C1 indicates a voltage of a high-capacity battery 3, and a thin solid line C2 indicates a discharge current flowing in the high-capacity battery 3. In the conventional battery pack, the high-output battery 2 and the high-capacity battery 3 are connected in parallel without going through the switch circuit, so that the thick solid line P1 and the dotted line C1 have the same waveform in FIG. 5.

When high-load pulse discharge and low-load pulse discharge are applied to the high-output battery 2 and the high-capacity battery 3, pulse waveforms of voltage values and current values are as shown in FIG. 5. Note that in the dotted line C1 and the thick solid line P1, which are the waveforms of the voltage values, the upper limit indicates the case of the low load and the lower limit indicates the case of the high load. On the other hand, in the thin solid line C2 and the one-dotted broken line P2, which are the waveforms of the current values, the upper limit indicates the case of the high load and the lower limit indicates the case of the low load.

In such a battery pack, at the early stage of discharge, the SOC of the high-output battery 2 is high, and hence discharge is performed preferentially from the high-output battery 2 at the time of high load as intended. However, at the end stage of discharge, the battery voltage of the high-output battery 2 becomes low because the high-output battery 2 has a small capacity, and a phenomenon occurs where a charge current flows from the high-capacity battery 3 to the high-output battery 2. Hence a large current flows to the high-capacity battery 3 at the time of high load to bring the battery into a state close to a short circuit, making long-hour power supply impossible.

Figure 6:
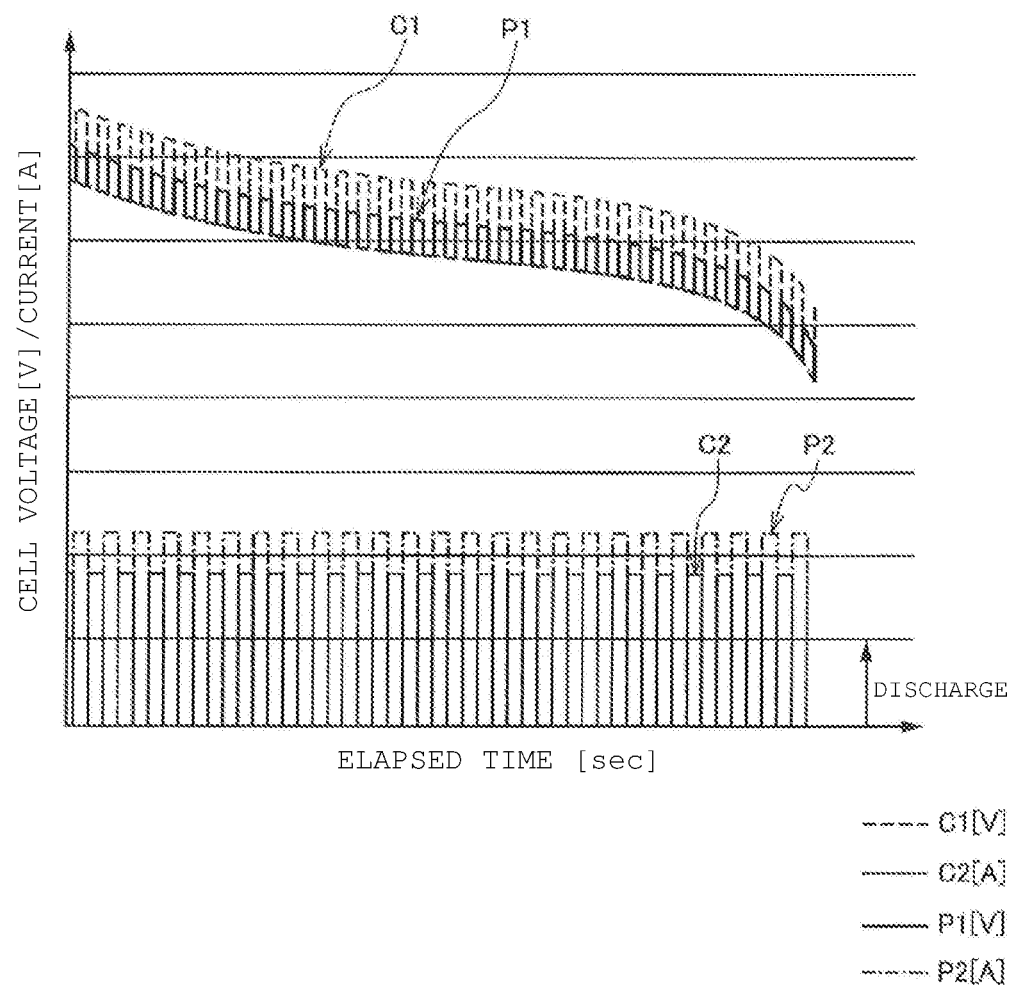
FIG. 6 is a graph illustrating a result of a discharge test using a battery pack according to an embodiment of the present technology.

FIG. 6 is a graph showing a result of a pulse discharge test using a battery pack according to an embodiment of the present technology.

In FIG. 6, a thick solid line P1 indicates a voltage of a high-output battery 2, and a one-dotted broken line P2 indicates a discharge current flowing in the high-output battery 2. Likewise, a dotted line C1 indicates a voltage of a high-capacity battery 3, and a thin solid line C2 indicates a discharge current flowing in the high-capacity battery 3.

When pulse discharge of high load and low load is applied to the high-output battery 2 and the high-capacity battery 3, as shown in FIG. 6, voltage values and current values have pulse waveforms of alternate amplitude between the upper limit value and the lower limit value. It should be understood that in the dotted line C1 and the thick solid line P1, which are the waveforms of the voltage values, the upper limit indicates the case of the low load and the lower limit indicates the case of the high load. On the other hand, in the thin solid line C2 and the one-dotted broken line P2, which are the waveforms of the current values, the upper limit indicates the case of the high load and the lower limit indicates the case of the low load. In the battery pack 20 according to the present technique, the high-output battery 2 and the high-capacity battery 3 are connected in parallel via the switch circuits 23 and 24, and the voltages of the high-output battery 2 and the high-capacity battery 3 are suppressed by opening and closing of the switch circuits 23 and 24. As a result, in FIG. 6, the amplitude of the dotted line C1 is larger than the amplitude of the thick solid line P1.

In such a battery pack 20, by controlling ON/OFF of the switch circuits 23 and 24, discharge is performed only from the high-output battery 2 in the case of high load and discharge is performed only from the high-capacity battery 3 in the case of low load. Therefore, even at the end stage of discharge, high-load discharge is possible, and long-time power supply is possible with a stable discharge current flowing in the high-output battery 2 and the high-capacity battery 3.

Figure 7:
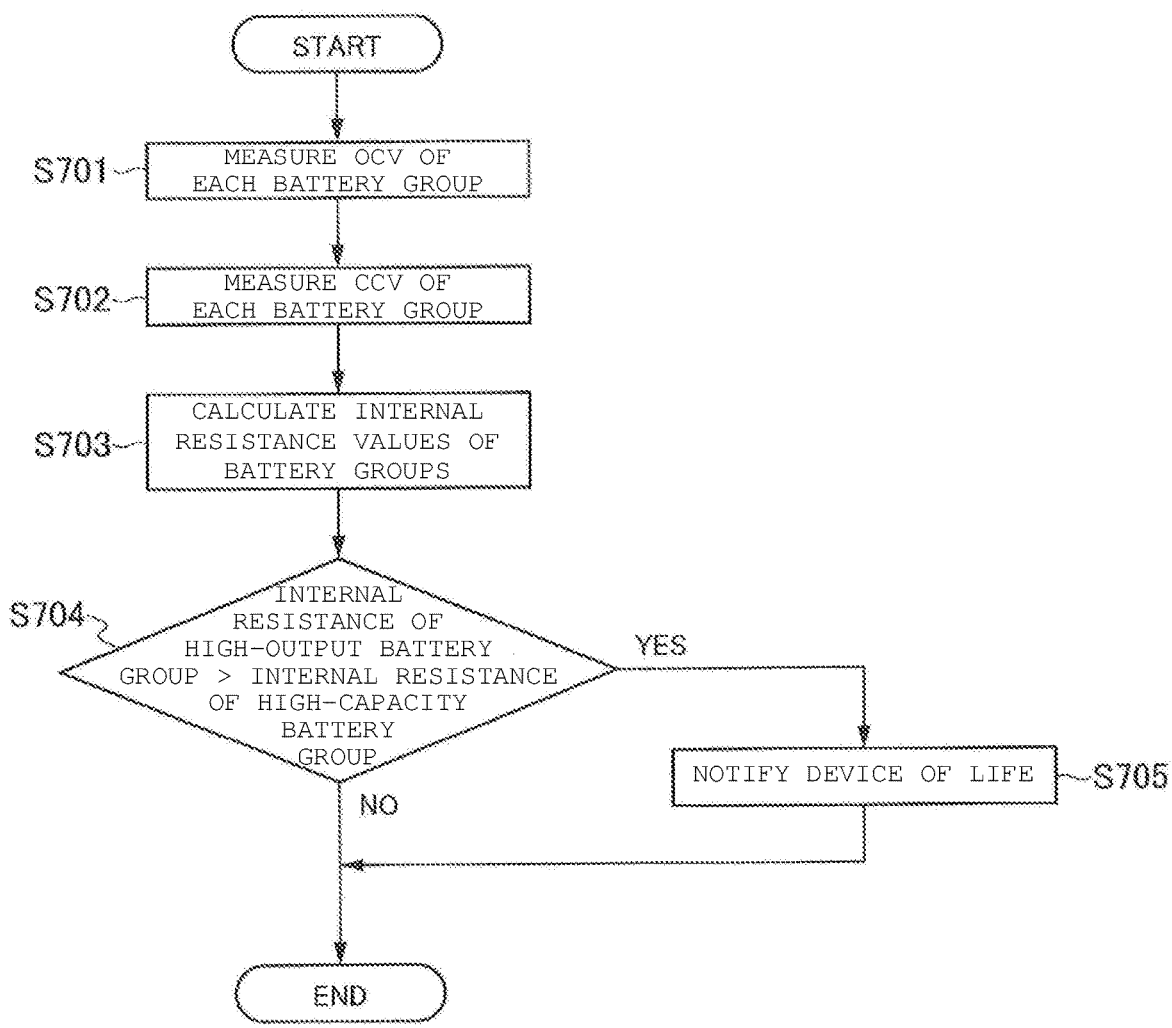
FIG. 7 is a flowchart for explaining a notification method for determination of a life of a battery pack according to an embodiment of the present technology.

FIG. 7 is a flowchart for explaining a notification method for determination of a life of a battery pack according to an embodiment of the present technology.

When the internal resistance value of the high-output secondary battery 2 deteriorates due to the charge or discharge or both charge and discharge cycle and becomes larger than the internal resistance value of the high-capacity secondary battery 3, there is no longer a merit of switching the battery group to be discharged in accordance with the discharge current value, and hence the MPU 25 can make notification as the battery life to the device. Note that the internal resistance value of the secondary battery is calculated from a discharge current value and a difference between an open-circuit voltage (OCV) during standing and a closed-circuit voltage (CCV) during discharge by (Expression 1) below. Here, the "open-circuit voltage" refers to a voltage between each terminal of the battery in a state where no current is allowed to flow in the battery. The "closed-circuit voltage" refers to a voltage between each terminal of the battery in a state where the battery is connected to the load and a current is allowed to flow.

$$\text{Internal resistance value} = (\text{OCV} - \text{CCV})/\text{discharge current value} \quad \text{(Expression 1)}$$

The notification method for determination of the life of the battery in the battery pack 20 according to the present embodiment will be described below.

First, in Step S701, the MPU 25 measures the open-circuit voltage (OCV) of each of the battery groups 21 and 22.

Next, in Step S702, the MPU 25 measures the closed-circuit voltage (CCV) of each of the battery groups 21 and 22.

Then, in Step S703, the MPU 25 calculates and measures the internal resistance value of each of the battery groups 21, 22 from the OCVs, CCVs, and discharge current values measured in Steps S701 and S702.

Subsequently, in Step S704, the MPU 25 determines whether or not the internal resistance of the high-output battery group 21 is larger than the internal resistance of the high-capacity battery group 22.

When the determination is YES, that is, when the internal resistance of the high-output battery group 21 is larger than the internal resistance of the high-capacity battery group 22, the MPU 25 serving as the notification unit notifies the electronic device and the like of the life in Step S705, and the life determination notifying processing in the battery pack shown in FIG. 7 is terminated.

On the other hand, when the determination is NO, that is, when the internal resistance of the high-output battery group 21 is equal to or smaller than the internal resistance of the high-capacity battery group 22, the life determination notifying processing in the battery pack shown in FIG. 7 is terminated as it is.

By the above processing, it is possible to notify the connected device whether or not there is a battery at the end of life, and thereby to see the replacement timing for the battery.

The embodiments of the present technique are not limited to the embodiments described above, and various modifications can be made without departing from the gist of the present technique. For example, it is possible to adopt a form in which all or a part of the plurality of embodiments described above are combined.

The present technology is described below in further detail according to an embodiment:

(1) A battery pack including: a plurality of secondary batteries different at least in discharge characteristic; at least one switch that switches an arbitrary secondary battery connected to a load among a plurality of secondary batteries; and a control unit that controls switching of the switch.

(2) The battery pack described in (1) above, wherein a first battery group, in which one or a plurality of batteries having a first discharge characteristic are connected in series or in parallel, and a second battery group, in which one or a plurality of batteries having a second discharge characteristic are connected in series or in parallel, are connected in parallel, and the switch is connected in series to each of the battery groups.

(3) The battery pack described in (1) above, wherein the control unit controls a charge current and/or a discharge current based on a magnitude of the load.

(4) The battery pack described in (1) above, wherein the control unit switches the switch in accordance with a result of comparison between a discharge current and a threshold.

(5) The battery pack described in (4) above, wherein the control unit increases the threshold when a state of charge (SOC) of a high-capacity secondary battery having at least the highest internal resistance among the plurality of secondary batteries is higher than a SOC of a high-output secondary battery having at least the lowest internal resistance among the plurality of secondary batteries, and the control unit decreases the threshold when the SOC of the high-capacity secondary battery is equal to or lower than the SOC of the high-output secondary battery.

(6) The battery pack described in (1) above, wherein a high-output secondary battery having at least the lowest internal resistance among the plurality of secondary batteries is closer to a terminal connected to the load than a high-capacity secondary battery having at least the highest internal resistance among the plurality of secondary batteries.

(7) The battery pack described in (1) above, wherein a current measurement resistor is connected to each of the plurality of secondary batteries.

(8) The battery pack described in (1) above, further including a notification unit that notifies that an internal resistance value of a high-output secondary battery having at least the lowest internal resistance among the plurality of secondary batteries is larger than an internal resistance value of a high-capacity secondary battery having at least the highest internal resistance among the plurality of secondary batteries.

(9) The battery pack described in (1) above, wherein the switch is a field effect transistor (FET) and is divided to serve for switching charge and serve for switching discharge.

(10) A charge/discharge control method for controlling charge and discharge of a battery pack by switching a switch in the battery pack including a plurality of secondary batteries different at least in discharge characteristic, and at least one switch that switches an arbitrary secondary battery connected to a load among a plurality of secondary batteries.

(11) The charge/discharge control method described in (10) above, wherein a first battery group, in which one or a plurality of batteries having a first discharge characteristic are connected in series or in parallel, and a second battery group, in which one or a plurality of batteries having a second discharge characteristic are connected in series or in parallel, are connected in parallel, and the switch is connected in series to each of the battery groups.

(12) The charge/discharge control method described in (10) above, wherein the control unit controls a charge current and/or a discharge current based on a magnitude of the load.

(13) The charge/discharge control method described in (10) above, wherein the control unit switches the switch in accordance with a result of comparison between a discharge current and a threshold.

(14) The charge/discharge control method described in (13) above, wherein the control unit increases the threshold when a state of charge (SOC) of a high-capacity secondary battery having at least the highest internal resistance among the plurality of secondary batteries is higher than a SOC of a high-output secondary battery having at least the lowest internal resistance among the plurality of secondary batteries, and the control unit decreases the threshold when the SOC of the high-capacity secondary battery is equal to or lower than the SOC of the high-output secondary battery.

(15) The charge/discharge control method described in above (10), wherein a high-output secondary battery having at least the lowest internal resistance among the plurality of secondary batteries is closer to a terminal connected to the load than a high-capacity secondary battery having at least the highest internal resistance among the plurality of secondary batteries.

(16) The charge/discharge control method described in above (10), wherein a current measurement resistor is connected to each of the plurality of secondary batteries.

(17) The charge/discharge control method according to claim 10, further including a notification unit that notifies that an internal resistance value of a high-output secondary battery having at least the lowest internal resistance among the plurality of secondary batteries is larger than an internal resistance value of a high-capacity secondary battery having at least the highest internal resistance among the plurality of secondary batteries.

(18) The charge/discharge control method described in above (10), wherein the switch is a field effect transistor (FET) and is divided to serve for switching charge and serve for switching discharge.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A battery pack comprising:
a plurality of secondary batteries having different discharge characteristics;
at least a first switch and a second switch configured to switch a secondary battery connected to a load among the secondary batteries; and
a controller configured to control the first and second switches, in accordance with a result of comparison between a discharge current of the battery pack and a threshold,
wherein the plurality of secondary batteries comprise a high-capacity battery group including batteries having a first discharge characteristic and a high-output battery group including batteries having a second discharge characteristic,
the high-capacity battery group and the high-output battery group are connected in parallel, and the first switch is connected in series to the high-capacity battery group and the second switch is connected in series to the high-output battery group,
wherein the controller is configured to increase the threshold when a state of charge (SOC) of the high-capacity battery group having the highest internal resistance among the plurality of secondary batteries is higher than a SOC of the high-output battery group having the lowest internal resistance among the plurality of secondary batteries, and the controller is configured to decreases the threshold when the SOC of the high-capacity battery group is equal to or lower than the SOC of the high-output battery group,
wherein the controller is configured to turn off the first switch of the high-capacity battery group and turn on the second switch of the high-output battery group when the discharge current of the battery pack is larger than the threshold,
wherein the controller is configured to detect a voltage of the high-capacity battery group and the high-output battery group,
wherein the controller is configured to turn off either the first switch of the high-capacity battery group or the second switch of the high-output battery group which is the higher voltage battery group when the battery pack starts charging, and
wherein the controller is configured to turn on both the first switch of the high-capacity battery group and the second switch of the high-output battery group when the voltage of the respective battery groups become equal in charging.

2. The battery pack according to claim 1, wherein the controller is configured to control one or both of a charge current and a discharge current based on a magnitude of the load.

3. The battery pack according to claim 1, wherein the high-output battery group having at least the lowest internal resistance among the plurality of secondary batteries is closer to a terminal connected to the load than the high-capacity battery group having the highest internal resistance among the plurality of secondary batteries.

4. The battery pack according to claim 1, wherein a current measurement resistor is connected to each of the plurality of secondary batteries.

5. The battery pack according to claim 1, further comprising a notification unit configured to notify that an internal resistance value of the high-output battery group having the lowest internal resistance among the plurality of secondary batteries is larger than an internal resistance value of the high-capacity battery group having the highest internal resistance among the plurality of secondary batteries.

6. The battery pack according to claim 1, wherein the switch includes a field effect transistor, and wherein the switch is configured to serve for switching charge and discharge.

7. A control method for controlling charge and discharge of a battery pack by switching a switch in the battery pack, wherein the battery pack includes:
a plurality of secondary batteries having different discharge characteristics, and
at least a first switch and a second switch configured to switch a secondary battery connected to a load among the secondary batteries; and
a controller configured to control the first and the second switches in accordance with a result of comparison between a discharge current of the battery pack and a threshold,
wherein the plurality of secondary batteries comprise a high-capacity battery group including batteries having a first discharge characteristic and a high-output battery group including batteries having a second discharge characteristic,
the high-capacity battery group and the high-output battery group are connected in parallel, and the first switch is connected in series to the high-capacity battery group and the second switch is connected in series to high-output battery group,
wherein the controller is configured to increases the threshold when a state of charge (SOC) of the high-capacity battery group having the highest internal resistance among the plurality of secondary batteries is higher than a SOC of the high-output battery group having the lowest internal resistance among the plurality of secondary batteries, and the controller is configure to decrease the threshold when the SOC of the high-capacity battery group is equal to or lower than the SOC of the high-output battery group, wherein the controller is configured to turn off the first switch of the high-capacity battery group and turn on the second switch of the high-output battery group when the discharge current of the battery pack is larger than the threshold, wherein the controller is configured to detect a voltage of the high-capacity battery group and the high-output battery group, wherein the controller is configured to turn off either the first switch of the high-capacity battery group or the second switch of the high-output battery group which is the higher voltage battery group when the battery pack starts charging, and wherein the controller is configured to turn on both the first switch of the high-capacity battery group and the second switch of the high-output battery group when the voltage of the respective battery groups become equal in charging.

8. The control method according to claim 7, wherein the controller is configured to control one or both of a charge current and a discharge current based on a magnitude of the load.

9. The control method according to claim 7, wherein the high-output battery group having the lowest internal resistance among the plurality of secondary batteries is closer to a terminal connected to the load than the high-capacity battery group having the highest internal resistance among the plurality of secondary batteries.

10. The control method according to claim 7, wherein a current measurement resistor is connected to each of the plurality of secondary batteries.

11. The control method according to claim 7, further comprising a notification unit configured to notify that an internal resistance value of a high-output battery group having the lowest internal resistance among the plurality of secondary batteries is larger than an internal resistance value of the high-capacity battery group having the highest internal resistance among the plurality of secondary batteries.

12. The control method according to claim 7, wherein the switch includes a field effect transistor, and wherein the switch is configured to serve for switching charge and discharge.

* * * * *